(12) United States Patent
Wyatt et al.

(10) Patent No.: US 11,150,481 B2
(45) Date of Patent: Oct. 19, 2021

(54) REALITY VIEWER

(71) Applicant: CHINA INDUSTRIES LIMITED, Wolverhampton (GB)

(72) Inventors: James Edward Alexander Wyatt, Los Angeles, CA (US); Graeme Taylor, Much Wenlock (GB); Mark Neil Gasson, Los Angeles, CA (US)

(73) Assignee: CHINA INDUSTRIES LIMITED, Wolverhampton (GB)

( * ) Notice: Subject to any disclaimer, the term of this patent is extended or adjusted under 35 U.S.C. 154(b) by 0 days.

(21) Appl. No.: 16/486,477

(22) PCT Filed: Feb. 16, 2018

(86) PCT No.: PCT/GB2018/050415
§ 371 (c)(1),
(2) Date: Aug. 15, 2019

(87) PCT Pub. No.: WO2018/150191
PCT Pub. Date: Aug. 23, 2018

(65) Prior Publication Data
US 2020/0233219 A1 Jul. 23, 2020

(30) Foreign Application Priority Data

Feb. 17, 2017 (GB) ..................................... 1702616
Jul. 27, 2017 (GB) ..................................... 1712107

(51) Int. Cl.
*G02B 27/01* (2006.01)
*G02B 27/09* (2006.01)
(Continued)

(52) U.S. Cl.
CPC ..... *G02B 27/0176* (2013.01); *G02B 27/0172* (2013.01); *G02B 27/0955* (2013.01);
(Continued)

(58) Field of Classification Search
None
See application file for complete search history.

(56) References Cited

U.S. PATENT DOCUMENTS 5,903,395 A 5/1999 Rallison et al.
8,508,830 B1 8/2013 Wang
(Continued)

FOREIGN PATENT DOCUMENTS

CN 205003394 U 1/2016
CN 105807428 A 7/2016
(Continued)

OTHER PUBLICATIONS

PCT International Search Report and Written Opinion of the International Searching Authority issued in International Application No. PCT/GB2018/050415, dated Jun. 21, 2018, 12 pages.
(Continued)

*Primary Examiner* — Aneeta Yodichkas
(74) *Attorney, Agent, or Firm* — Miller Nash LLP

(57) ABSTRACT

A reality viewer is disclosed. The reality viewer comprises a frame suitable for holding a portable electronic device and a viewing aperture. The reality viewer can interchange between a first viewing mode wherein the viewing aperture is closed and a second viewing mode wherein the viewing aperture is open. The first viewing mode is configured for virtual reality operation as a user only observes the screen of the electronic portable device located within the frame. By contrast, in the second viewing mode is configured for augmented reality operation as a user observes the real world through the viewing aperture which is augmented by images generated by the electronic portable device located within the frame. The reality viewer also has the advantage of being mobile; low cost; employs simple technology; produces an immersive, maximised field of view; and pro-
(Continued)

vides a real-world view in augmented reality mode of operation.

21 Claims, 15 Drawing Sheets

(51) Int. Cl.
    *G02B 27/16* (2006.01)
    *G06F 3/01* (2006.01)
    *G06T 19/00* (2011.01)

(52) U.S. Cl.
    CPC ......... *G02B 27/0972* (2013.01); *G02B 27/16* (2013.01); *G06F 3/011* (2013.01); *G06T 19/006* (2013.01); *G02B 2027/0123* (2013.01)

(56) References Cited

U.S. PATENT DOCUMENTS

| | | | | |
|---|---|---|---|---|
| 2015/0234189 | A1* | 8/2015 | Lyons | A63F 13/26 |
| | | | | 345/174 |
| 2016/0011422 | A1* | 1/2016 | Thurber | G02B 27/0176 |
| | | | | 345/8 |
| 2016/0062454 | A1* | 3/2016 | Wang | G09G 5/003 |
| | | | | 345/633 |
| 2016/0116748 | A1 | 4/2016 | Carollo et al. | |
| 2016/0314624 | A1* | 10/2016 | Li | G06F 3/0482 |
| 2017/0045746 | A1 | 2/2017 | Ellsworth et al. | |

FOREIGN PATENT DOCUMENTS

| | | |
|---|---|---|
| CN | 106526859 A | 3/2017 |
| EP | 2814252 A2 | 12/2014 |
| WO | 9524713 A1 | 9/1995 |
| WO | 2005067584 A2 | 7/2005 |
| WO | 2016191049 A1 | 12/2016 |

OTHER PUBLICATIONS

Search Report issued in United Kingdom Patent Application No. 1702616.2, dated Jul. 14, 2017, 1 page.
Search Report issued in United Kingdom Patent Application No. 1712107.0, dated Dec. 15, 2017, 1 page.

* cited by examiner

REALITY VIEWER

CROSS-REFERENCE TO RELATED APPLICATIONS

This application is a national stage filing under 35 U.S.C. § 371of International Application No. PCT/GB2018/050415, filed Feb. 16, 2018, entitled "REALITY VIEWER," and claims priority from United Kingdom Patent Application No. 1702616.2 filed Feb. 17, 2017, and United Kingdom Patent Application No. 1712107.0, filed Jul. 27, 2017, the disclosures of all of which are incorporated herein by reference in their entirety.

FIELD OF THE INVENTION

The present invention relates to a viewer apparatus and in particular a reality viewer for observing virtual or augmented reality.

BACKGROUND TO THE INVENTION

Virtual reality is an interactive artificial environment created by a computer. The environment can be experienced in real time through multiple sensory features produced by the computer such that a user can respond to the environment, then influence and determine the evolution of the environment.

An example of a device employed to experience a virtual reality is a virtual reality viewer, or alternatively referred to as a virtual reality headset. Numerous examples of these already exist in the market place.

FIG. 1 presents an exemplary virtual reality viewer 1 known in that art. The virtual reality viewer 1 can be seen to comprise a main body 2 attached to which are two eye pieces 3 which focus onto an electronic screen 4. The virtual reality viewer 1 is held in place by head straps 5 attached to the main body 2.

The virtual reality viewer 1 allows a user to see a virtual reality displayed upon the electronic screen 4. As an example of the interactive aspect of the virtual reality viewer 1, they may further comprise motion sensors 6 which can detect movement in the real world, such as rotation of the virtual reality viewer 1. This movement can be incorporated into the user's experience to change the direction of view within the virtual environment.

There are limitations to the applications of the virtual reality viewer 1. In particular, there are limitations to the interaction that the virtual reality viewer 1 can provide within the virtual reality. For example, a user can move different parts of their body to interact with the virtual reality. However, the user cannot safely walk whilst wearing the virtual reality viewer 1 as they cannot see where they are going in the real world.

An alternative reality experience is termed augmented reality. Augmented reality is based upon a real-time direct or indirect view of the real world where the real world is supplemented with computer generated interactive sensory features.

Augmented reality can be experienced through an augmented reality viewer. Such devices are known in that art. An example of an augmented reality viewer 7, as shown in FIG. 2, is a device comprising many of the same features as the virtual reality viewer 1, but the augmented reality viewer 7 generally also comprises a camera 8, such that an electronic screen 4 displays a view of the real world as captured by the camera 8. This allows a user to walk around the real world, as viewed through the augmented reality viewer 7. In addition, the real world, as perceived through the viewer 7, can be supplemented by adding computer generated features. The augmented reality viewer 7 as just described can be referred to as a pass through augmented reality viewer.

There are limitations to augmented reality viewers. For instance, an image of the real world provided by a camera can deprive a user of depth perception which is required to safely traverse through the real world. There are a range of augmented reality viewers on the market which vary in technical implementation and expense.

In practice, the electronic screen 4 of the reality viewers 1, 7 may take the form of a portable electronic device such as a tablet or phone. Such devices typically have motion sensors 6 built in. The portable electronic device is removable as the reality viewers may comprise a frame to hold the portable electronic device.

The field of view, in the context of a human, is the proportion or extent of the real world that is observed by both eyes at a given instance. More specifically, humans have an almost 180 degree forward-facing horizontal field of view. In the context of, for example, a virtual reality, the field of view is limited by the proportion or extent of the virtual reality observed at a given instance.

The reality viewers 1, 7, as described above, typically have a horizontal field of view ranging between 90 to 120 degrees. The field of view depends of the size of the electronic screen 4. For example, where the electronic screen 4 takes the form of a relatively small portable electronic device this would result in a small field of view (e.g. 90 degrees). The reality viewers 1, 7 do not have a fully immersive field of view as the perceived virtual or augmented reality does not make up the entire extent of the user's spatial range in vision.

An alternative device to experience an augmented reality is simply a portable electronic device 9, such as a phone or tablet, held at arm's length by a user, as depicted by FIG. 3. Where a portable electronic device 9 differs from the augmented reality viewer 7 is that it has a narrower field of view. This means the user has a partial, direct view of the real world facilitating safely walking around. However, the narrow field of view is non-immersive and provides a limited experience of the augmented reality.

SUMMARY OF THE INVENTION

It is an object of an aspect of the present invention to provide a reality viewer that obviates or at least mitigates one or more of the aforesaid disadvantages of reality viewers known in the art.

According to a first aspect of the present invention there is provided a reality viewer comprising a main body having a viewing aperture and a screen aperture, a screen locator attached to the main body that provides a means for locating an electronic screen with the screen aperture; and a viewing axis perpendicular to the viewing aperture, wherein the reality viewer is configurable between a first mode of operation in which the viewing aperture is closed and the electronic screen is visible along the viewing axis, and a second mode of operation in which the viewing aperture is open and images generated by the electronic screen augment a view along the viewing axis through the open viewing aperture.

The reality viewer is therefore interchangeable between a first viewing mode that allows for a virtual reality experience and a second viewing mode that allows for an augmented reality experience.

Most preferably the reality viewer further comprises an optical system housed within the main body. In the first mode of operation the electronic screen is preferably visible through the optical system. Preferably, when the reality viewer is in the second mode of operation the optical system provides a means for the images generated by the electronic screen to be augment with the view through the open viewing aperture.

Preferably, the optical system comprises one or more lenses. Optionally the one or more lenses comprise a doublet lens.

Optionally, the optical system further comprises a lens adjuster that provides a means for varying the focal distance of the one or more lenses. Adjusting the focal distance of the one or more lenses allows for the focus length of the reality viewer to be optimised between first and second viewing modes and for different users.

Preferably, the optical system comprises a first and a second reflective surface wherein the reflectivity of the first reflective surface is greater than the reflectivity of the second reflective surface. This may be achieved by making the second reflective surface a partially reflective surface.

The first and or second reflective surfaces may comprise a mirror. Alternatively, the first and or second reflective surface may comprise a prism.

Most preferably, the first reflective surface is parallel to the second reflective surface. Most preferably when the reality viewer is in the second mode of operation the first and second reflective surfaces bisect the viewing axis at 45 degrees. In this embodiment, the one or more lenses preferably lie in a plane parallel to the viewing axis.

In one embodiment, the first and second reflective surfaces are pivotally mounted to the main body to provide a means for moving the screen locator to open and close the viewing aperture. In this embodiment, when the reality viewer is configured to be in the first mode of operation the first and second reflective surfaces are parallel to the viewing axis and the electronic screen provides a means for closing the viewing aperture. Most preferably the one or more lenses are oriented to lie in a plane perpendicular to the viewing axis.

In an alternative embodiment, the viewing aperture comprises a mechanical shutter that provides a means for opening and closing the viewing aperture.

Alternatively, the viewing aperture may comprise a window that provides a means for opening and closing the viewing aperture. The window may comprise a switchable glass made form one or more switchable materials selected from the group of switchable materials comprising electrochromic, micro-blind and polymer dispersed liquid crystal materials. In these embodiments, the application of a voltage switches the window between a transparent, open state and an opaque, closed state.

The main body may further comprise one or more eyeholes. The main body may also further comprise a nose cavity.

The main body may comprise one or more fixtures that provide a means for attaching the reality viewer to a head strap.

Optionally, the reality viewer comprises a universal controller. The universal controller may provide a means for remotely controlling a portable electronic device mounted in the screen locator of the reality viewer. The universal controller may also provide additional means for a user to interact with the virtual or augmented reality.

According to a second aspect of the present invention there is provided a method of configuring a reality viewer having a main body having a viewing aperture and a screen aperture, a screen locator attached to the main body that provides a means for locating an electronic screen with the screen aperture; and a viewing axis perpendicular to the viewing aperture, the method comprising closing or opening the viewing aperture
wherein
when the viewing aperture is closed the electronic screen is visible along the viewing axis, and
when the viewing aperture is open images generated by the electronic screen augment a view along the viewing axis through the open viewing aperture.

The first viewing mode therefore provides a means for viewing a virtual reality generated by the electronic screen housed within the screen locator while the second viewing mode provides a means for viewing an augmented reality generated by the electronic screen.

Optionally, closing or opening of the viewing aperture comprises moving the position of the screen locator. The method may further comprise orientating one or more lenses housed within the main body to lie in a plane perpendicular or parallel to the viewing axis.

Alternatively, closing or opening of the viewing aperture comprises closing or opening a mechanical shutter.

In a further alternative, closing or opening of the viewing aperture comprises closing or opening a window comprising one or more switchable materials selected from the group of switchable materials comprising electrochromic, micro-blind and polymer dispersed liquid crystal materials.

Optionally the method of configuring the reality viewer further comprises adjusting a focal length of one or more lenses.

The method of configuring the reality viewer may further comprises remotely controlling a portable electronic device located within the frame.

Embodiments of the second aspect of the invention may comprise features to implement the preferred or optional features of the first aspect of the invention or vice versa.

According to a third aspect of the present invention there is provided a reality viewer comprising:
 a main body having a viewing axis;
 a screen locator comprising an optical system and a frame the frame being attached to the main body by a pivot mounting;
 wherein the screen locator provides a means for moving the frame between a first viewing position wherein the frame is coincident with the viewing axis and a second viewing position wherein the frame is offset from the viewing axis.

The reality viewer is therefore interchangeable between a first position that allows for a virtual reality experience and a second position that allows for an augmented reality experience.

The frame is preferably pivotally mounted upon the pivot mounting.

The main body preferably comprise a first surface, substantially perpendicular to the viewing axis, the first surface comprising one or more eyeholes. The first surface may also comprise a nose cavity.

Most preferably, the optical system is moveable in conjunction with the screen locator.

Preferably, the optical system comprises one or more lenses.

Optionally, the optical system further comprises a lens adjuster that provides a means for varying the focal distance of the one or more lenses. Adjusting the focal distance of the one or more lenses allows for the focus length of the reality viewer to be optimised between first and second positions and for different users.

Preferably, the optical system may comprise a pivotally mounted reflective surface.

Preferably, the optical system may also comprise a pivotally mounted partially reflective surface.

Most preferably, the pivotally mounted reflective surface is parallel to the pivotally mounted partially reflective surface.

In the first viewing position, the pivotally mounted reflective surface and the pivotally mounted partially reflective surface do not bisect the viewing axis. In comparison, when in the second viewing position the pivotally mounted reflective surface and the pivotally mounted partially reflective surface bisect the viewing axis. Most preferably the pivotally mounted reflective surface and the pivotally mounted partially reflective surface bisect the viewing axis at 45 degrees.

The pivotally mounted reflective surface may comprise a mirror. Alternatively, the pivotally mounted reflective surface comprises a prism. In a similar manner, the partially reflective surface may comprise a mirror or a prism The main body may comprise one or more slots suitable for receiving one or more pins of the screen locator. The one or more slots and pins provide a means for assisting movement of the reality viewer between the first and second viewing positions.

The main body may comprise one or more fixtures that provide a means for attaching the reality viewer to a head strap.

Optionally, the reality viewer comprises an electric motor arranged to automatically move the reality viewer between the first and the second viewing positions.

Optionally, the reality viewer comprises a universal controller. The universal controller provides a means for remotely controlling a portable electronic device mounted in the frame of the reality viewer. The universal controller may also provide additional means for a user to interact with the virtual or augmented reality.

Embodiments of the third aspect of the invention may comprise features to implement the preferred or optional features of the first or second aspects of the invention or vice versa.

According to a fourth aspect of the present invention there is provided a method of configuring a reality viewer the method comprising:
  selecting between a first or second mode of operation for the reality viewer by;
  moving a frame of the reality viewer to a first viewing position wherein the frame is coincident with a viewing axis of the reality viewer when the first mode or operation is selected; or
  moving the frame of the reality viewer to a second viewing position wherein the frame is offset from the viewing axis of the reality viewer when the second mode or operation is selected.

Preferably, the frame pivots between the first and second modes of operation.

Most preferably, the first viewing position provides a means for viewing a virtual reality generated by an electronic screen housed within the frame.

Most preferably, the second viewing position provides a means for viewing an augmented reality generated by an electronic screen housed within the frame.

Optionally the method of configuring the reality viewer further comprises adjusting the focal length of one or more lenses.

The method of configuring the reality viewer may further comprises remotely controlling a portable electronic device located within the frame.

Embodiments of the fourth aspect of the invention may comprise features to implement the preferred or optional features of the first to third aspects of the invention or vice versa.

BRIEF DESCRIPTION OF DRAWINGS

There will now be described, by way of example only, various embodiments of the invention with reference to the drawings, of which.

Figure 1:
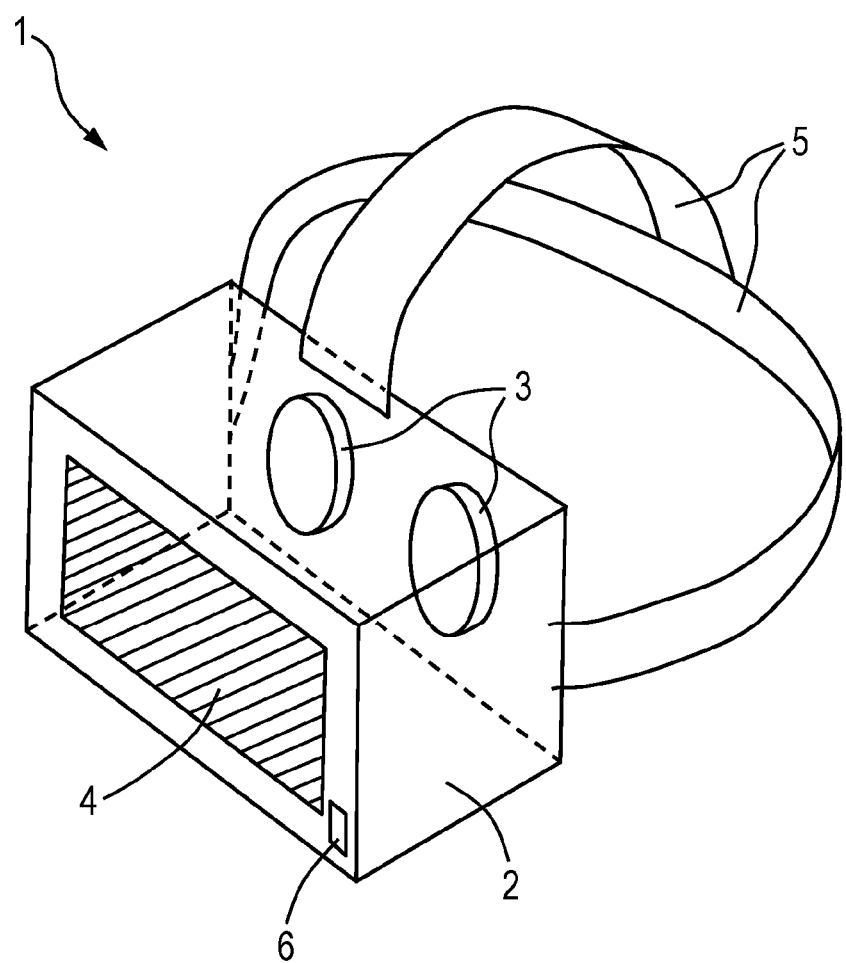
FIG. 1 presents a perspective view of a prior art virtual reality viewer.
Figure 2:
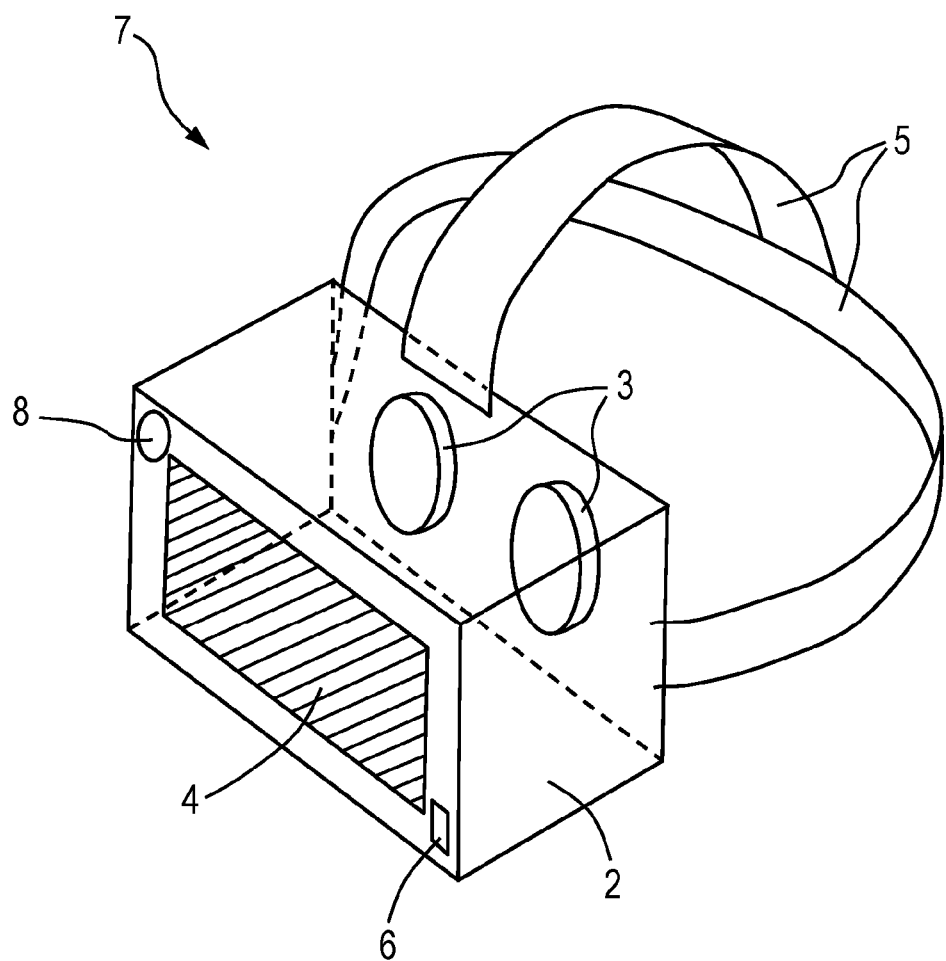
FIG. 2 presents a perspective view of a prior art augmented reality viewer.
Figure 3:
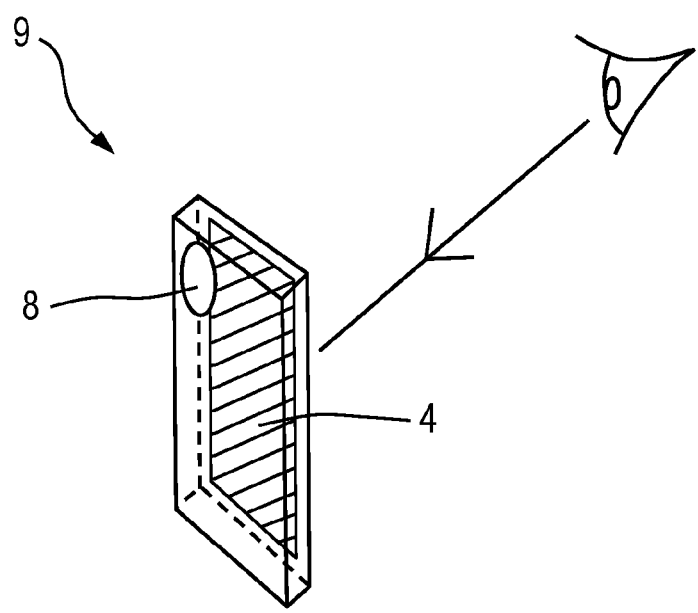
FIG. 3 presents a perspective view of a prior art portable electronic device for use to experience an augmented reality.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF THE PREFERRED EMBODIMENTS

An explanation of the present invention will now be described with reference to a first embodiment, as represented by FIGS. 4 to 9, and an alternative second embodiment, as represented by FIGS. 10 to 15.

Figure 4:
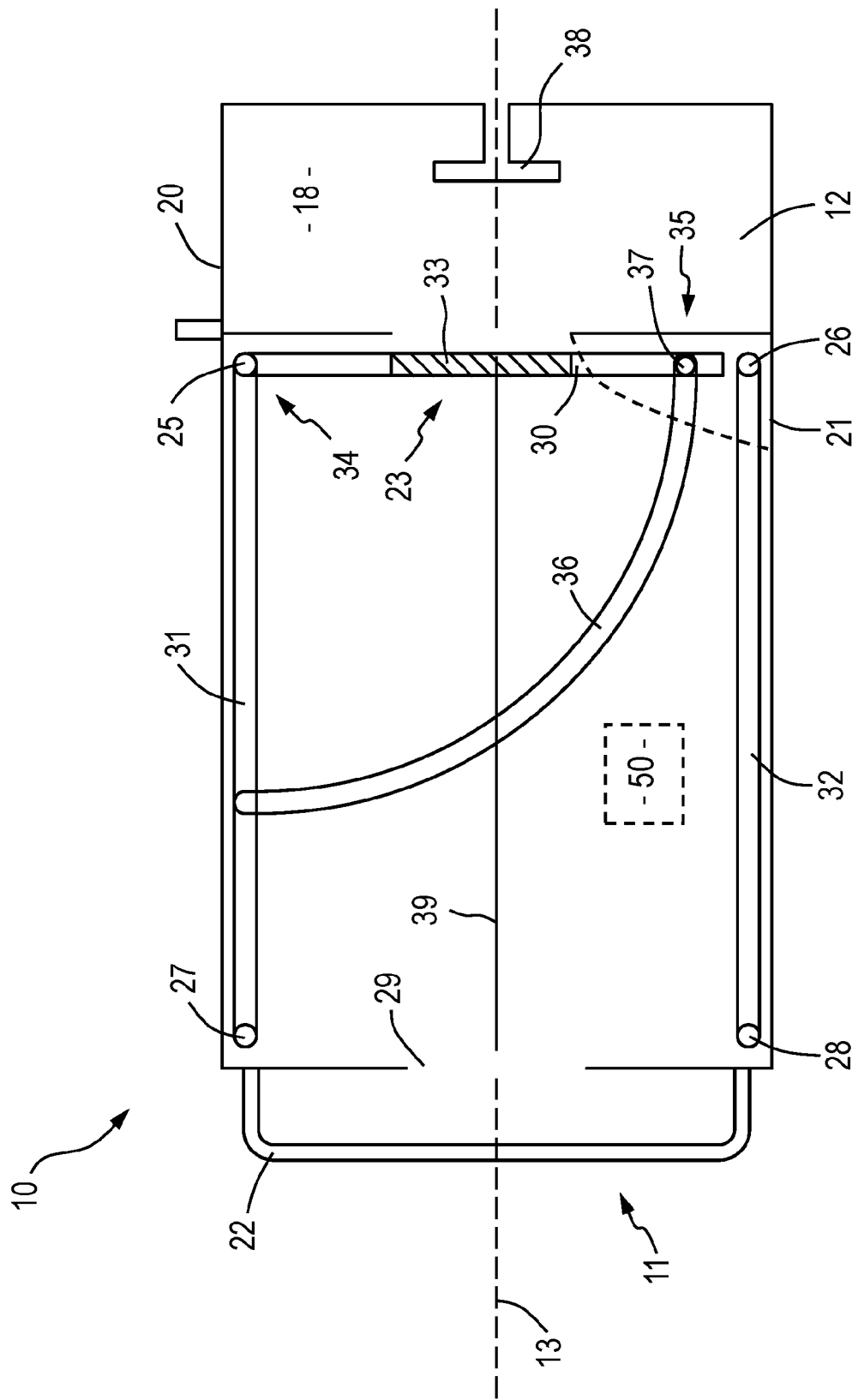
FIG. 4 presents a cross-section schematic of a reality viewer in accordance with an embodiment of the present invention within a first viewing position.
Figure 5:
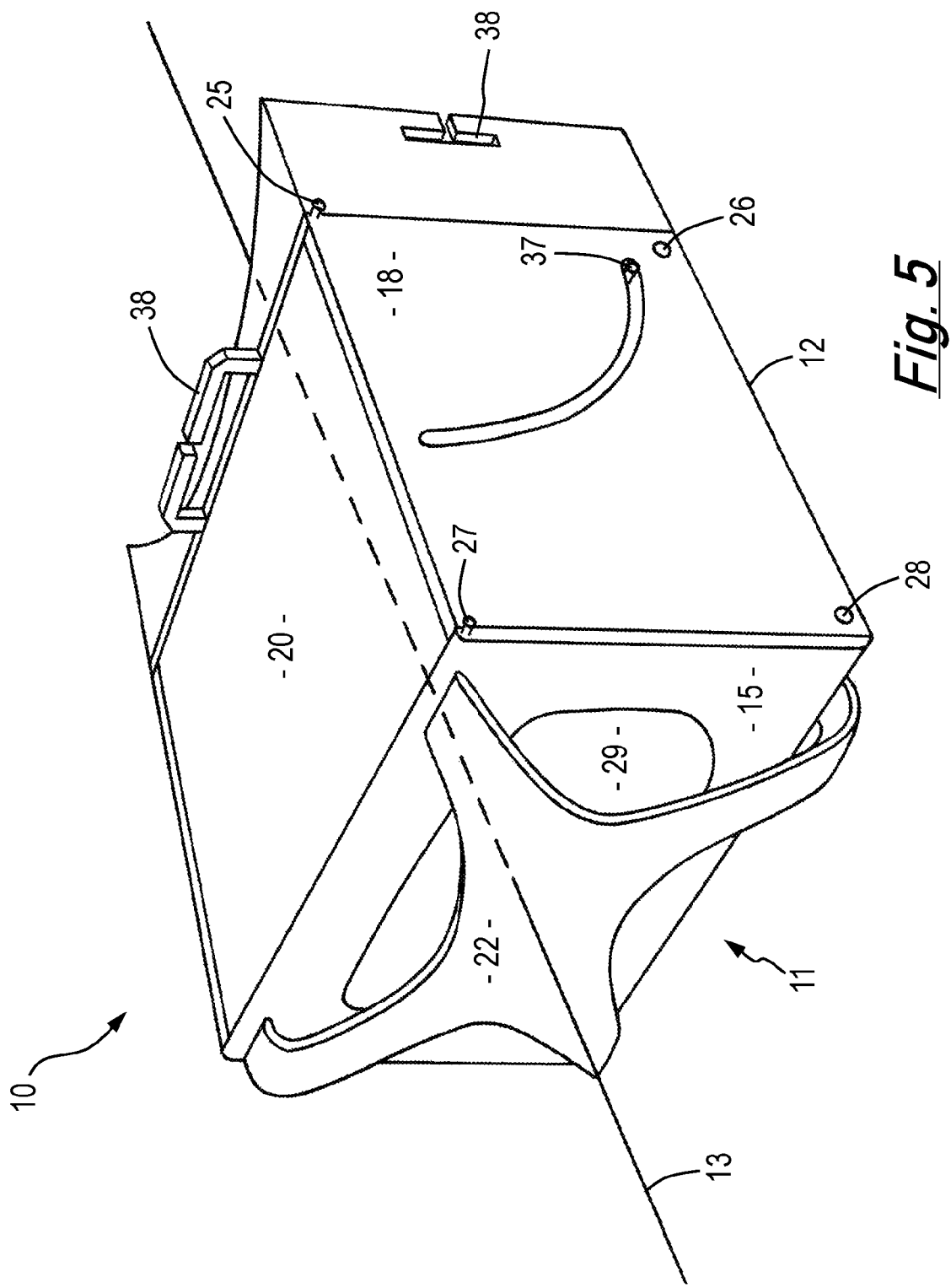
FIG. 5 presents a perspective view of the first viewing position of the reality viewer of FIG. 4.
Figure 6:
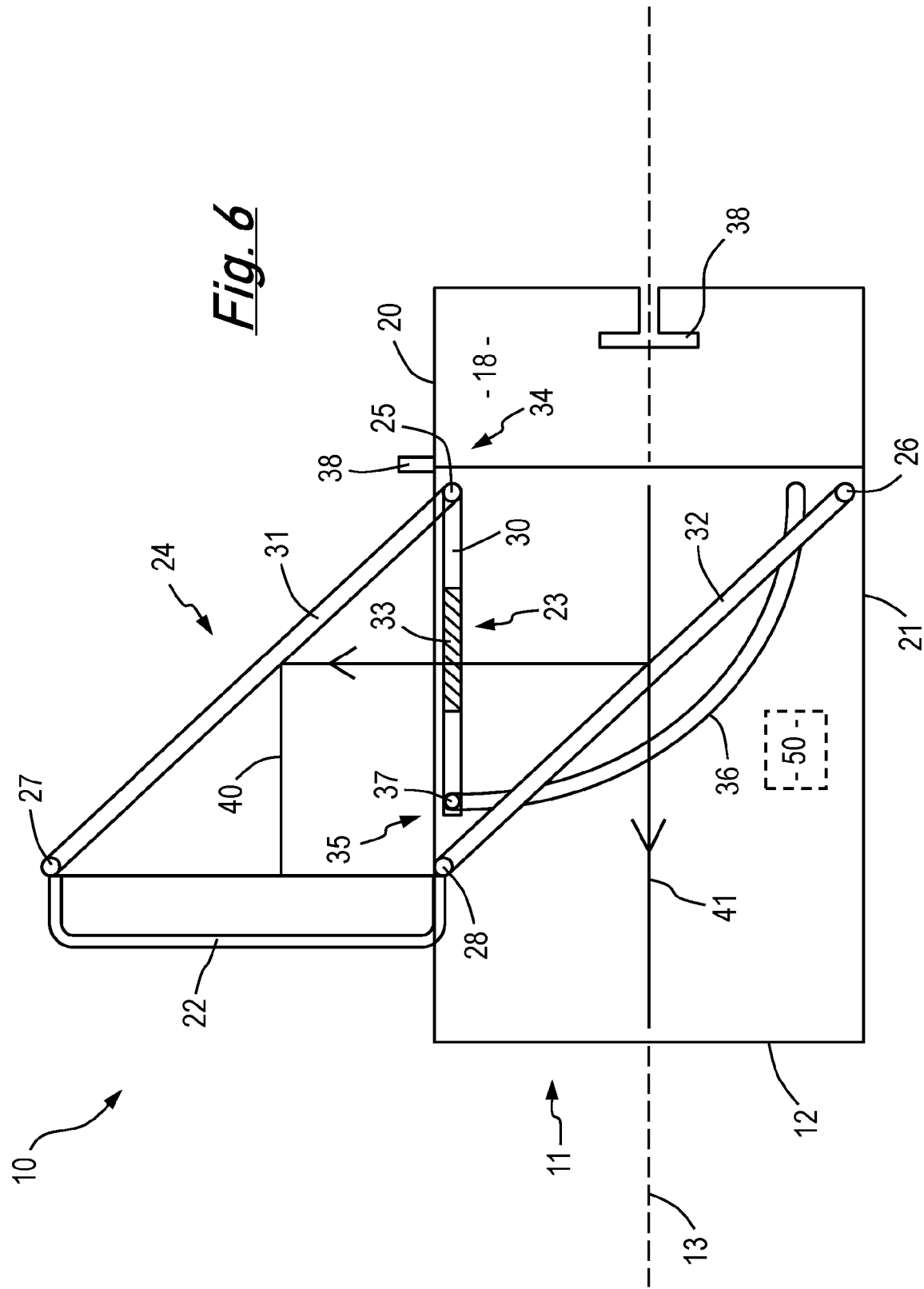
FIG. 6 presents a cross-section schematic of the reality viewer of FIG. 4 in a second viewing position.
Figure 7:
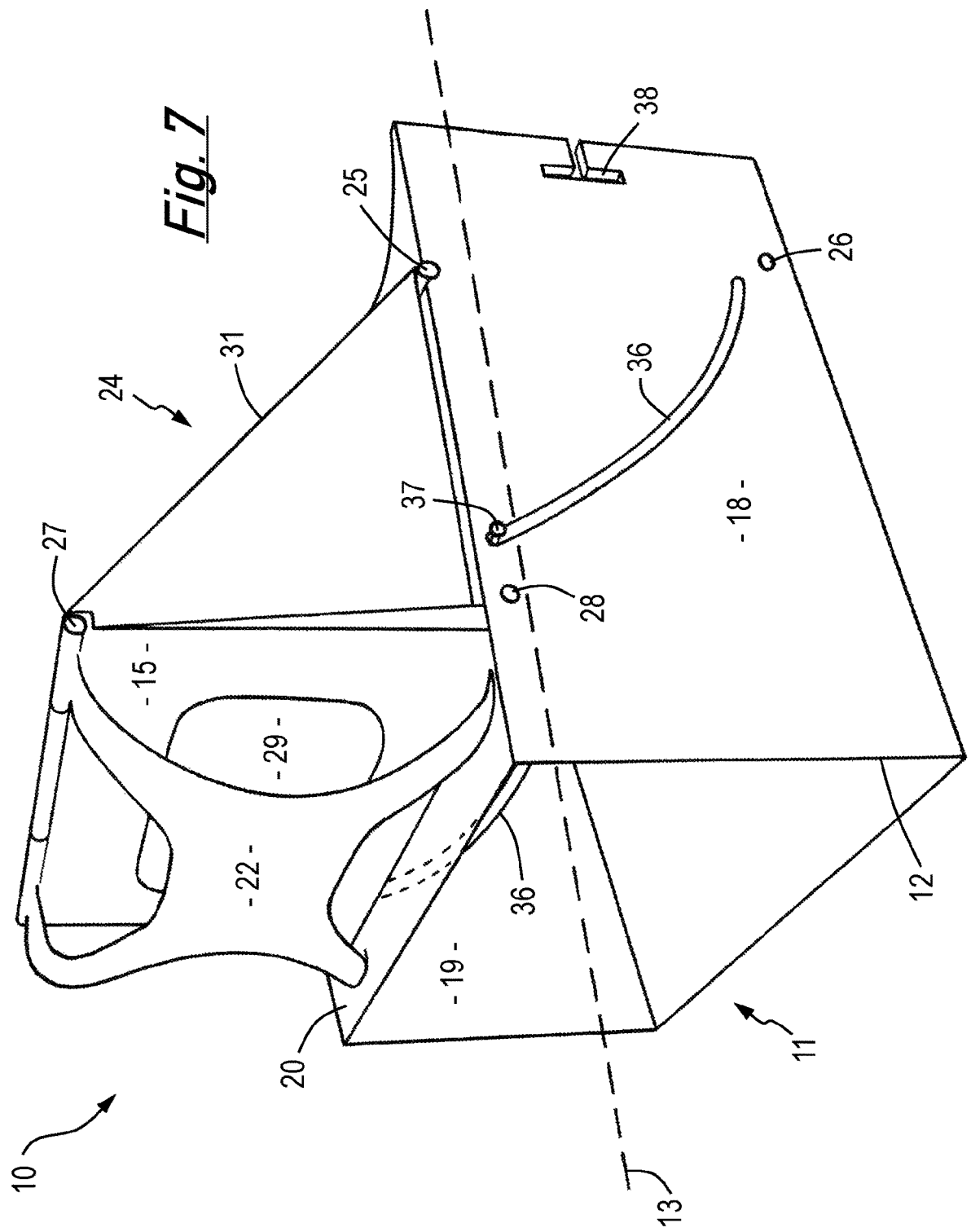
FIG. 7 presents a perspective view of the second viewing position of the reality viewer of FIG. 4.
Figure 8:
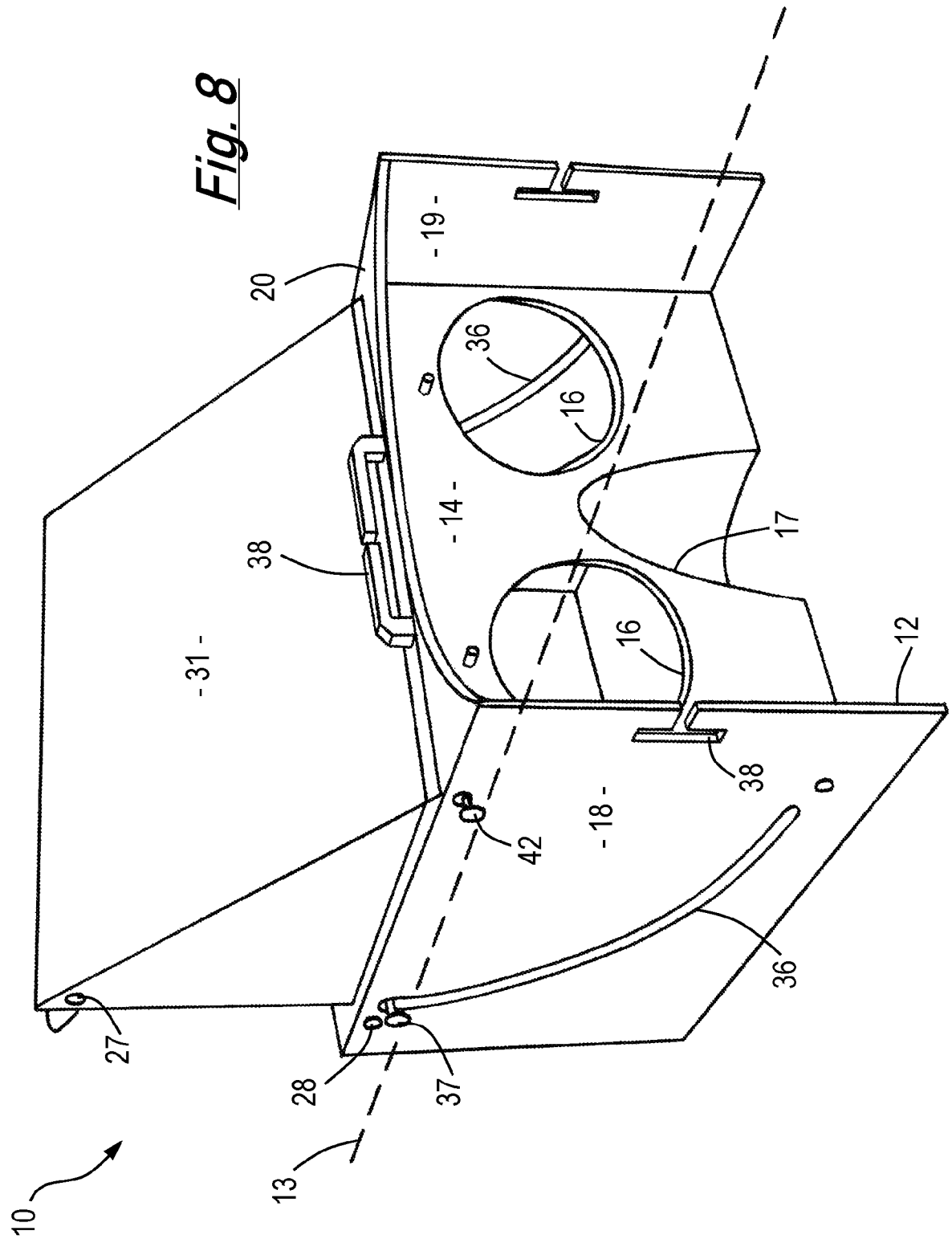
FIG. 8 presents an alternative perspective view of the second viewing position of the reality viewer of FIG. 4.

With respect to the first embodiment of the present invention, FIGS. 4 to 8 present a reality viewer 10 having a viewing aperture 11. In particular, FIGS. 4 and 5 present the reality viewer 10 in a first viewing position wherein the viewing aperture 11 is closed by a portable electronic device 9. Therefore, when the reality viewer 10 is configured in the first viewing position it is suitable for viewing a virtual reality generated by the portable electronic device 9. Alternatively, FIGS. 6 to 8 present the reality viewer 10 in a second viewing position wherein the viewing aperture 11 is open. As a result, when the reality viewer 10 is configured in the second viewing position it is suitable for use as an augmented reality viewer i.e. a user's view of the surrounding environment through the open viewing aperture 11 is augmented by images generated by the portable electronic device 9.

From these figures, the reality viewer 10 can be seen to comprises a main body 12. The main body 12 is substantially cuboid. A viewing axis 13 passes through the centre of the main body 12, intersecting a first 14 and second 15 opposing surfaces of the main body 12. The first surface 14 comprises eye holes 16 and a nose cavity 17.

The main body 12 further comprises a third surface 18, a fourth surface 19, a fifth surface 20 and a sixth surface 21, which are all substantially parallel to the viewing axis 13 and all substantially perpendicular to the first 14 and second 15 surfaces. The third 18 and fourth 19 surfaces are preferably equally offset on opposing sides of the viewing axis 13. The fifth 20 and sixth 21 surfaces are substantially perpendicular to the third 18 and fourth 19 surfaces. Similarly, the fifth 20 and sixth 21 surfaces are preferably equally offset on opposing sides of the viewing axis 13. These surfaces, (14, 15, 18, 19, 20, 21), can be clearly seen in the perspective view of the reality viewer shown by FIG. 5.

The reality viewer 10 further comprises a screen locator 22 and an optical system 23 best seen in FIGS. 6 to 8. The screen locator 22 comprises a frame, attached to the main body 12 via a pivot mounting 24. The pivot mounting 24 is attached to the main body 12 at pivot axes 25 and 26. The frame 22 is attached to the pivot mounting 24 at the pivot axes 27 and 28. The pivot axes 25, 26, 27 and 28 extend between the third 18 and fourth 19 surfaces.

The frame 22 provides a means for holding a portable electronic device 9 comprising an electronic screen 4. There is a screen aperture 29 located within the second surface 15 of the main body 12 and is suitable for receiving the electronic screen 4 of the portable electronic device 9. The portable electronic device 9 fits within the frame 22 such that the electronic screen 4 is integrated with the screen aperture 29. The electronic screen 4 faces towards, and is substantially parallel to, the first surface 14. The viewing axis 13 is coincident and substantially normal to the frame 22.

The optical system 23 comprises a lens plane 30, a first reflective surface 31 and a second reflective surface 32 wherein the reflectivity of the first reflective 31 surface is greater than the reflectivity of the second reflective surface 32. This may be achieved by making the second reflective surface 32 a partially reflective surface. The lens plane 30 can be seen to comprise one or more lenses 33.

The lens plane 30 has a proximal end 34 and a distal end 35. The proximal end 34 of the lens plane 30 is attached to the pivot axis 25. The third 18 and fourth 19 surfaces of the main body 12, each comprise a slot 36. The slots 36 are curved. Attached to the distal end 35 of the lens plane is a pin 37, extending through the lens plane 30, between the third 18 and fourth 19 surfaces. The pin 37 passes through the slots 36 on the third 18 and fourth 19 surfaces. The distal end 35 of the lens plane 30 therefore moves and pivots as guided by the slots 36 and pin 37.

The reality viewer 10 further comprises head strap fixtures 38 upon the third 18, fourth 19 and fifth 20 surfaces such that the head straps can be attached to the main body 12.

When the reality viewer 10 is configured in the first viewing position, the lens plane 30 of the optical system 23 is adjacent and substantially parallel to the first surface 14 such that it bisects the viewing axis 13. In this configuration, the one or more lenses 33 of the lens plane 30 align with the eye holes 16. The second surface 15 is positioned within the viewing aperture 11 which is at the focal distance of the one or more lens 33. As a result, there exists a direct optical path 39 between the eye holes 16 and electronic screen 4 when in situ within the frame 22. In this configuration, the reality viewer 10 is suitable for viewing a virtual reality generated by the portable electronic device 9.

The reflective surface 31 and semi-reflective surface 32 are not an active component of the optical system 23 in the first viewing position of the reality viewer 10. The reflective surface 31 is connected to pivot axes 25, 27 and is stored substantially coplanar with the fifth surface 20. While, the partially-reflective surface 32 is connected to pivot axes 26, 28 and is stored substantially coplanar with the sixth surface 21.

In the second viewing position, as shown by FIGS. 6 to 8, the screen locator 22 provides a means for configuring the frame 22 such that it is offset from the viewing axis 13 thus opening the viewing aperture 11. The pivot mounting 24, pivots such that the frame 22 is offset from the viewing axis 13 in a direction substantially perpendicular to the fifth 20 and sixth 21 surfaces.

The reflective surface 31 and the partially reflective surface 32 pivot with the pivot mounting 24 such that these surfaces 31, 32 are at an angle relative to viewing axis 13. Preferably, this angle is 45 degrees.

The reflective surface 31 and the partially reflective surface 32 provide a diverted optical path 40 to the electronic screen 4, when the portable electronic device 9 is in situ in the frame 22, and the reality viewer 10 is configured in the second viewing position. In this configuration, the optical system 23 is analogous to a periscope. As an alternative to reflective surfaces 31, 32, the optical system 23 could employ prisms to divert the optical path 40.

In the second viewing position, the lens plane 30 pivots about the pivot axis 25 such that it is parallel and adjacent to the fifth surface 20. The diverted optical path 40 bisects the lens plane 30. However, the lens plane 30 no longer bisects the viewing axis 13.

As the frame 22 and lens 33 do not bisect the viewing axis, there is a direct optical path 41 through the main body 12, along the viewing axis 13, providing a view of the real world via the viewing aperture 11. This optical path 41 passes through the partially reflective surface 32 and the viewing aperture 11 in the main body 12.

The partially reflective surface 32 provides a means to superimpose the image from the electronic screen 4, via optical path 40, upon the direct view, optical path 41, of the real world. In this configuration, the reality viewer 10 is suitable for viewing an augmented reality of the real world as generated by the portable electronic device 9.

The optical path 39 in the first viewing position from the eye holes 16 to the electronic screen 4 may be a different length to the corresponding optical path 40 in the second viewing position. For the reality viewer 10 to remain in perfect focus it may require adjusting the focal distance of the lens 33. In practice, adjustment of the focal distance is not always found to be necessary as the path difference is sufficiently small and negligible that most user's eyesight, particularly younger users, could naturally compensate for this path difference.

Nevertheless, the reality viewer 10 may further comprise the functionality to adjust the focal distance of the lens 33 so that the reality viewer 10 remains in focus when configured in both first and second viewing positions and to fine tune the focus when required. As shown by FIG. 8, the adjustment means may take the form of a rotating lens adjustment knob 42 connected to pivot axis 25. The pivot axis 25 is connected to the proximal end 34 of the lens plane 30.

Figure 9:
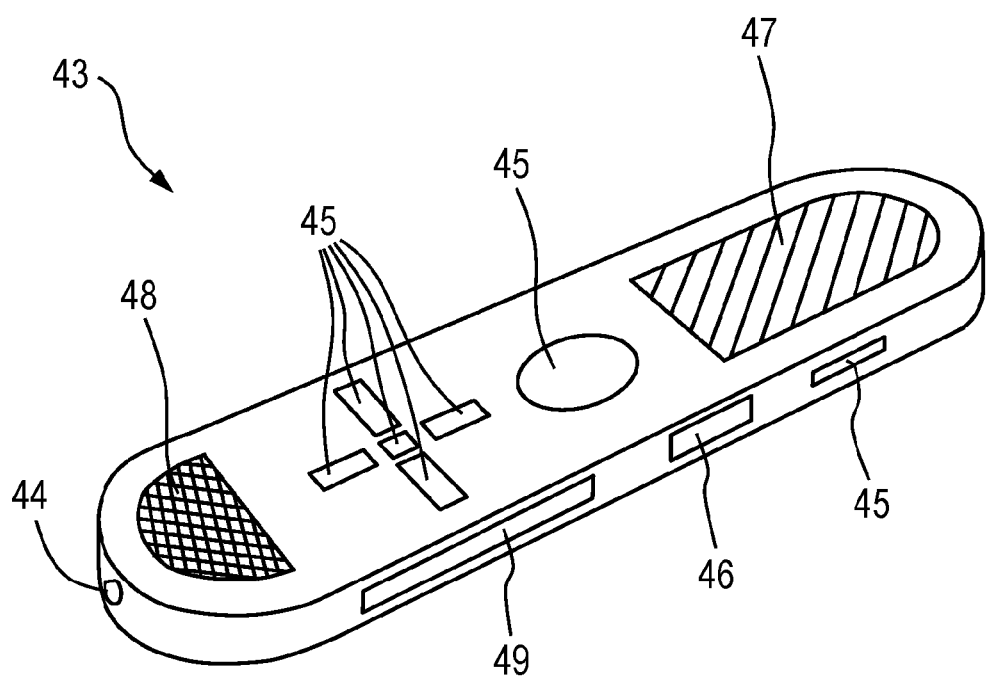
FIG. 9 presents a perspective view of a universal controller for the reality viewer of FIG. 4.

The reality viewer 10 may further comprise a universal controller 43, see FIG. 9. The portable electronic device 9, when mounted in the frame 22 of the reality viewer 10 may be more difficult to access such that it is cumbersome to change settings and run computer programs. The universal controller 43 is a device that provides a means of remotely controlling the portable electronic device 9 as well as facilitating additional interactive features to enhance the virtual or augmented reality experience. An example of a similar controller is disclosed in UK patent publication number GB 2,524,993 A.

The universal controller 43 comprises a communication module 44, one or more buttons 45, one or more internal sensors 46, a small electronic screen 47, a speaker 48 and an expansion port 49. The communication module 44 allows the universal controller 43 to communicate with the portable electronic device 9. The buttons 45 facilitate selecting and adjusting the settings of the portable electronic device 9, such as the volume, or responding to a feature in the virtual or augmented reality. The sensors 46 detect, for example, movements of a user which may be in response to the virtual or augmented reality. The small electronic screen 47 can display settings, such as the battery life of the portable electronic device 9. The expansion port 49 facilitates updating or running alternative computer software future proofing the universal control 43.

It will be apparent to the skilled reader that the first viewing position of the reality viewer 10 is suitable for experiencing a virtual reality while the second viewing position of the reality viewer 10 is suitable for experiencing an augmented reality. When interchanging between the first and second viewing positions of the reality viewer, the position of the moving components, such as the screen locator 22, can be manually altered by a user. Alternatively, this movement could be automated with an electric motor 50 incorporated into the reality viewer 10.

Figure 10:
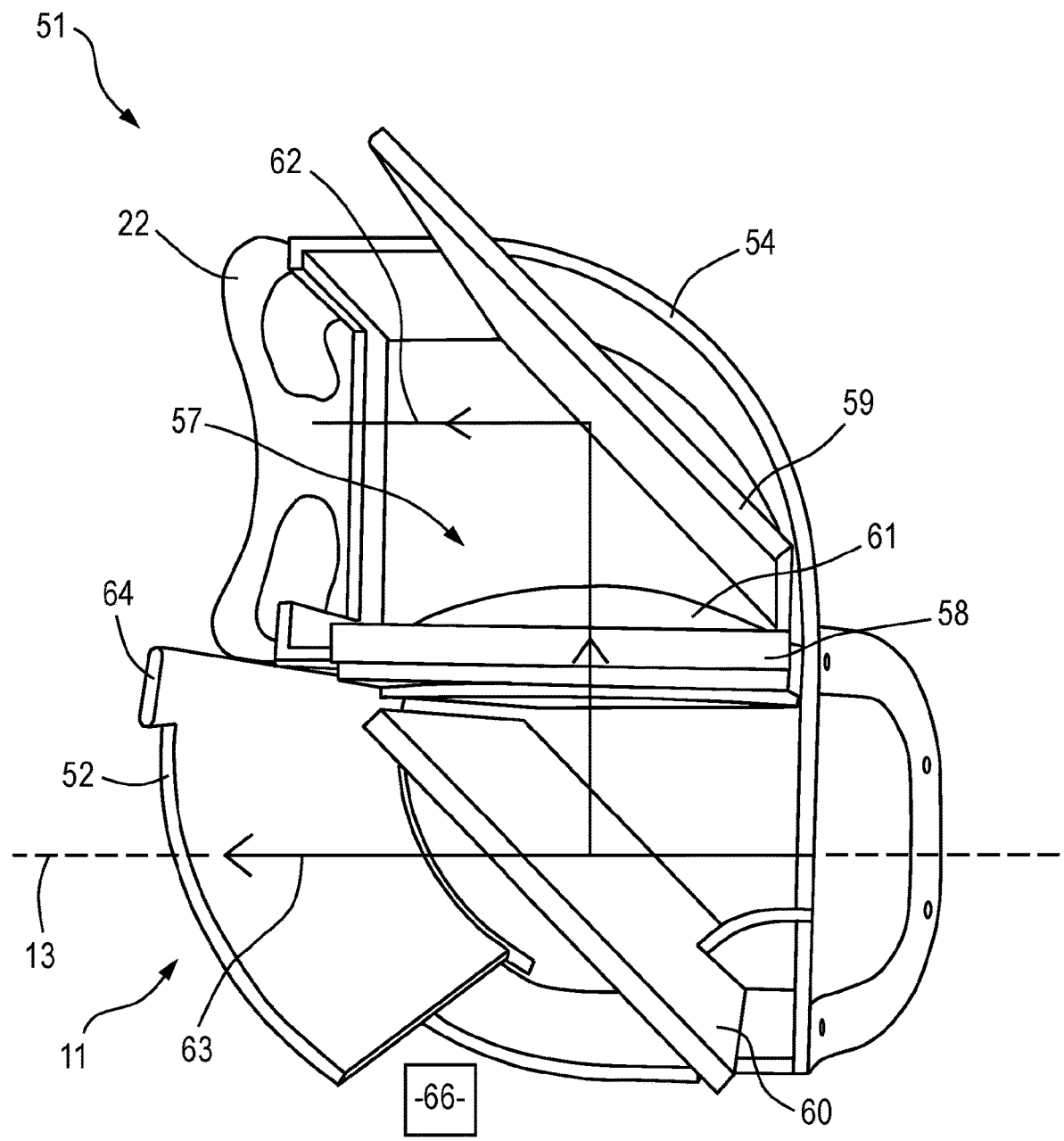
FIG. 10 presents a cross-section view of a reality viewer in accordance with an alternative embodiment of the present invention within a first viewing mode.
Figure 11:
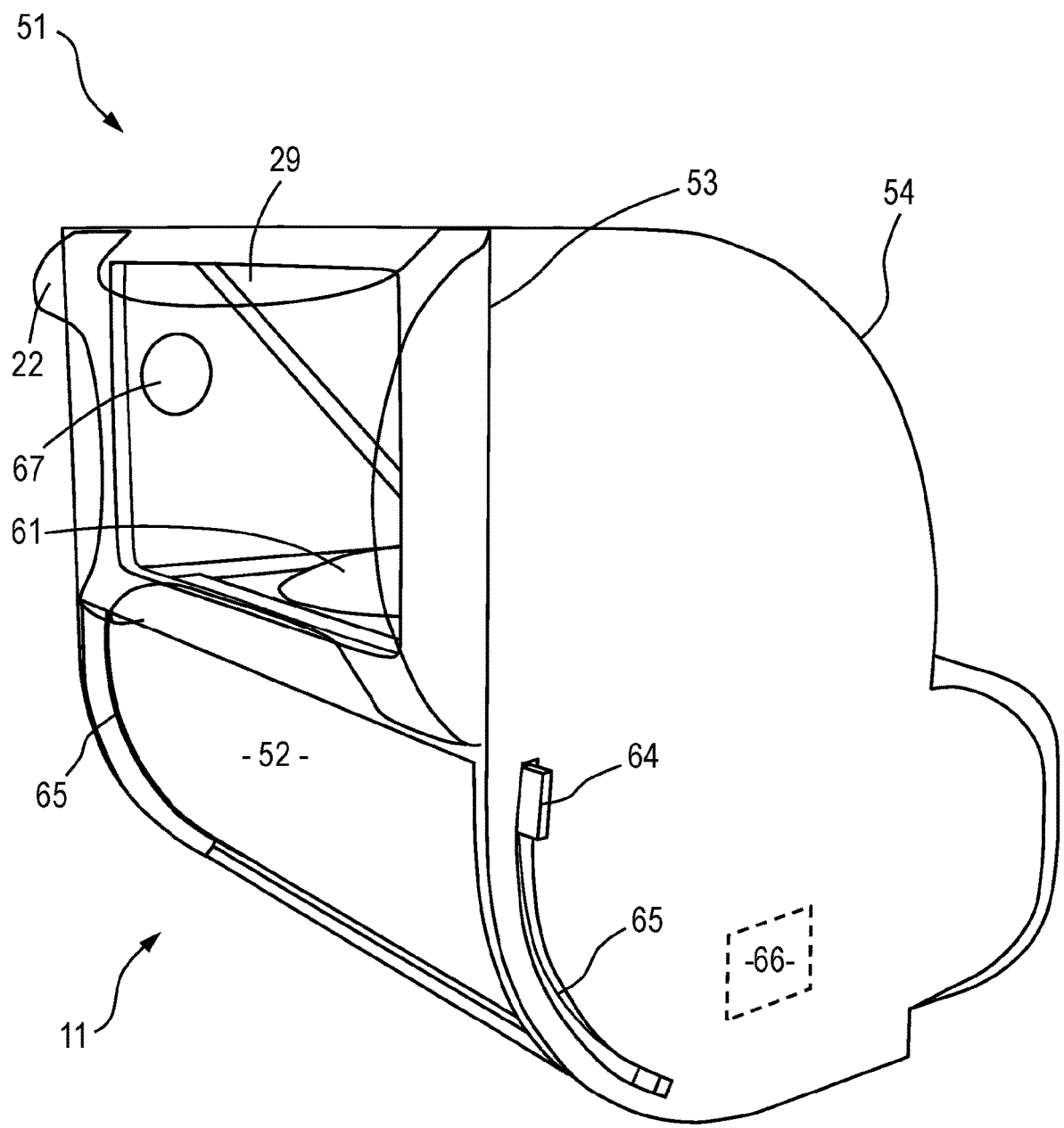
FIG. 11 presents a perspective view of the first viewing mode of the reality viewer of FIG. 10.
Figure 12:
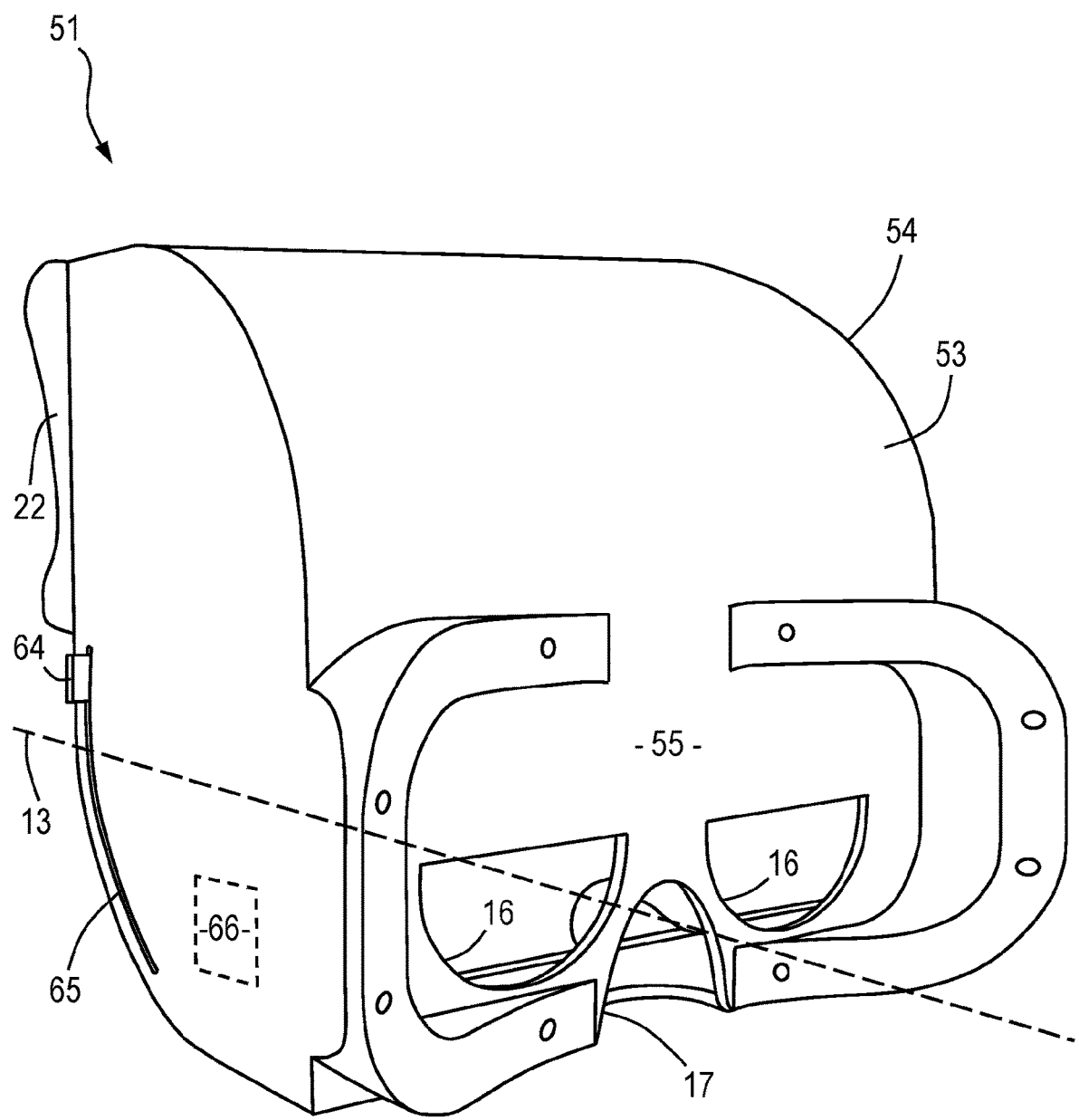
FIG. 12 presents an alternative perspective view of the first viewing mode of the reality viewer of FIG. 10.
Figure 13:
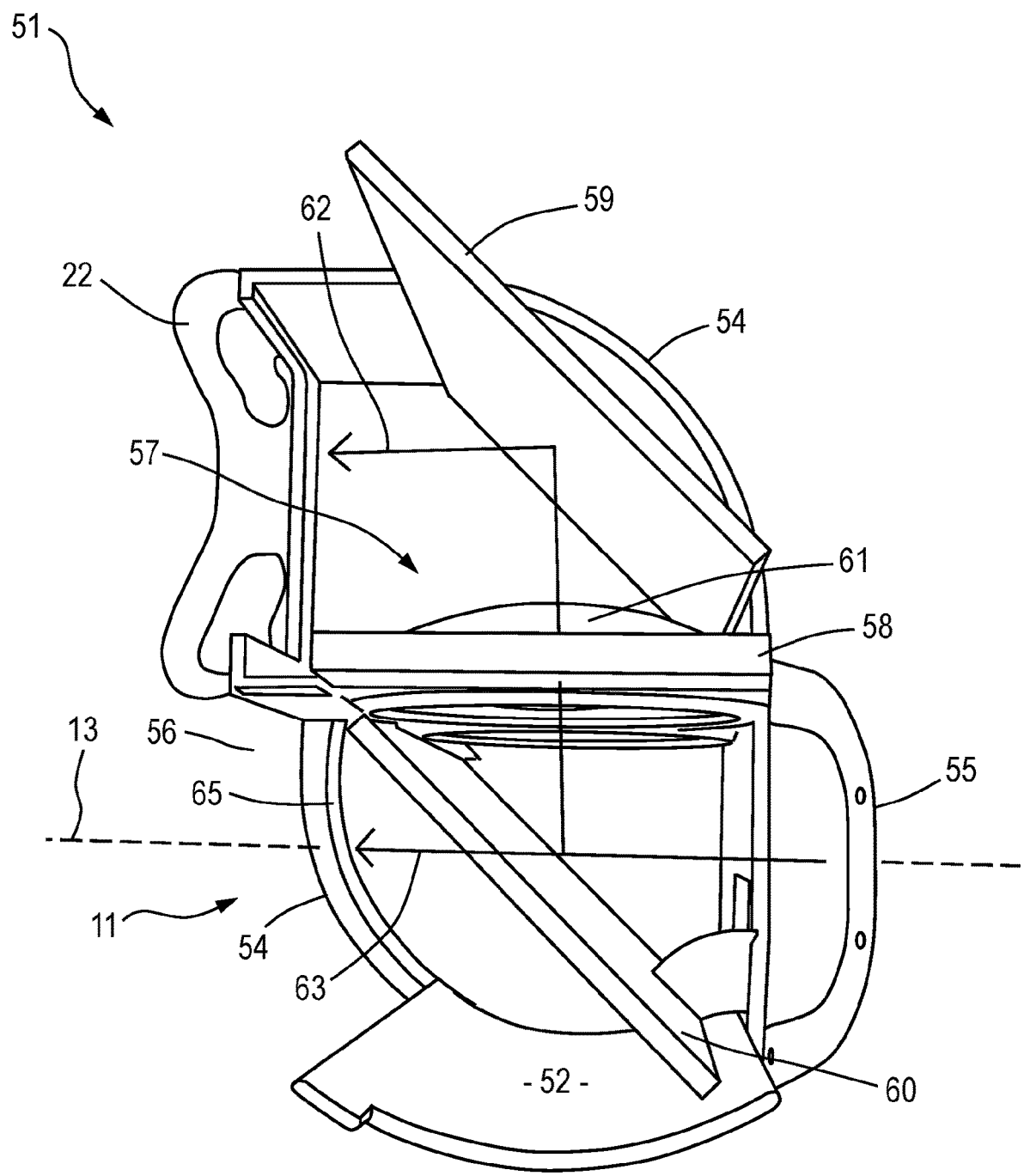
FIG. 13 presents a cross-section view of the reality viewer of FIG. 10 in a second viewing mode.
Figure 14:
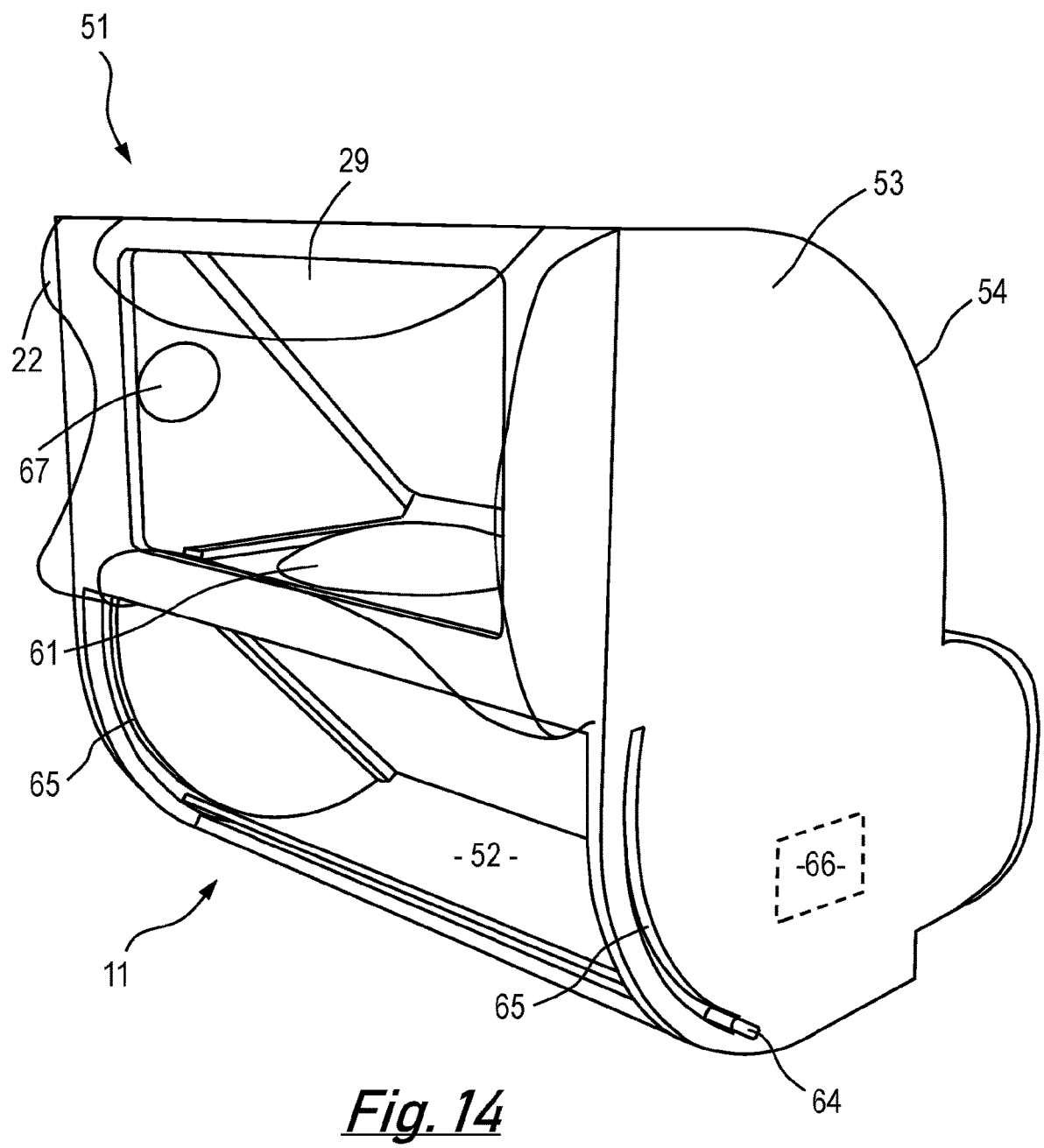
FIG. 14 presents a perspective view of the second viewing mode of the reality viewer of FIG. 10.
Figure 15:
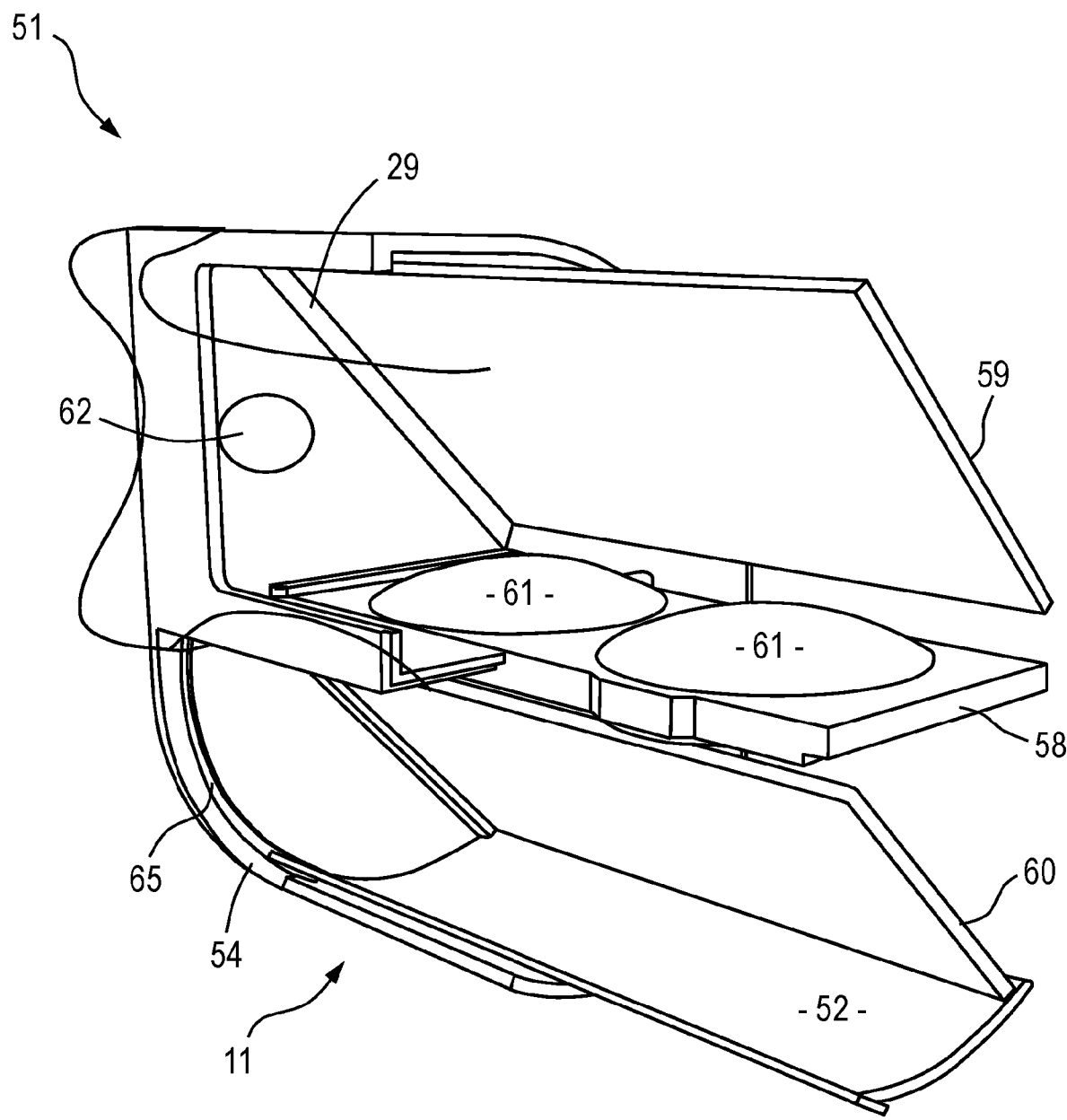
FIG. 15 presents a cutaway perspective view of the second viewing mode of the reality viewer of FIG. 10.

An explanation of an alternative embodiment of a reality viewer 51 having a viewing aperture 11 will now be described with reference to FIGS. 10 to 15. In particular, FIGS. 10 to 12 present the reality viewer 51 in a first viewing position wherein the viewing aperture 11 is closed by a mechanical shutter 52. Therefore, when the reality viewer 51 is configured in the first viewing position it is suitable for viewing a virtual reality generated by the portable electronic device 9. Alternatively, FIGS. 13 to 15 present the reality viewer 10 in a second viewing position wherein the mechanical shutter 52 is retracted in order to open the viewing aperture 11. As a result, when the reality viewer 51 is configured in the second viewing position it is suitable for use as an augmented reality viewer i.e. a user's view of the surrounding environment through the open viewing aperture 11 is augmented by images generated by the portable electronic device 9.

From FIGS. 10 to 15 the reality viewer 51 can be seen to comprise a main body 53. The main body 53 is substantially cuboid with one or more rounded edges 54. A viewing axis 13 passes through the main body 53, intersecting a first surface 55 and a second surface 56 which are opposing surfaces of the main body 53.

The first surface 55 comprises eye holes 16 and a nose cavity 17. The second surface 56 comprises the viewing aperture 11 and a screen aperture 29. A frame 22 is attached to the second surface 56 adjacent to the screen aperture 29. The eye holes 16 and the viewing aperture 11 are located on the first 55 and second 56 surfaces respectively such that both are coincident and substantially normal with viewing axis 13. The frame 22 is located on the second surface 56 such that it is offset from viewing axis 13.

The frame 22 provides a means for holding a portable electronic device 9 comprising an electronic screen 4. The portable electronic device 9 fits within the frame 22 such that the electronic screen 4 is integrated with the screen aperture 29 located within the second surface 56. The electronic screen 4 faces towards, and is substantially parallel to, the first surface 55.

The main body 53 houses an optical system 57. The optical system 57 comprises a lens plane 58, a first reflective surface 59 and a second, partially-reflective surface 60, as can clearly be seen from the cutaway perspective view shown by FIG. 15. The lens plane 58 can be seen to comprise two lenses 61. The lens plane 58 is substantially parallel to and offset from the viewing axis 13.

The two lenses 61 are preferably doublet lenses with a short focal distance. The advantage of employing doublet lenses is they project a virtual image plane at mid distance from the observer, e.g. approximately 1 metre, which is within a comfortable viewing range for a user's eye without any additional corrective lenses.

The reflective surface 59 and the partially reflective surface 60 are mounted at an angle relative to viewing axis 13. Preferably, this angle is 45 degrees. The partially reflective surface 60 is coincident with viewing axis 13 whereas the reflective surface 59 is offset from viewing axis 13.

The reflective surface 59 and the partially reflective surface 60 provide a diverted optical path 62 between the eyeholes 16 and the electronic screen 4, when in situ in the frame 22. This optical system 57 is analogous to a periscope. The diverted optical path 62 passes through lenses 61. As an alternative to reflective surfaces 59, 60, the optical system 57 could employ prisms to divert the optical path 62.

The optical system 57 also provides a non-diverted optical path 63 between the eyeholes 16 and the viewing aperture 11. The non-diverted optical path 63 passes through the partially reflective surface 60. It will be noted that the non-diverted optical path 63 does not pass through lenses 61.

The viewing aperture 11 as shown in FIGS. 10 to 15 comprises the mechanical shutter 52. The mechanical shutter 52 can be manually moved between a closed position, as clearly shown by FIG. 10, and an open position, as shown by FIG. 13. In the closed position, the mechanical shutter 52 is coincident with viewing axis 13. Conversely, in the open position the mechanical shutter 52 is retracted such that it is not coincident with viewing axis 13. The mechanical shutter 52 is curved such that the radius of curvature matches or is substantially similar to that of the rounded edge 54 of the main body 53. As a result, the mechanical shutter 52 is substantially parallel and adjacent to the rounded edge 54 of the main body 53 when in the retracted, open position.

The mechanical shutter 52 comprises two tabs 64. The main body 53 comprises two slots 65. The tabs 64 pass through and are constrained by the slots 65 such that the movement of the mechanical shutter 52 between the closed and open position is guided by the tabs movement within the slots 65.

The tabs 64 protrude from the main body 53 such that they can be manipulated by a user to move the mechanical shutter 52 between the closed and open positions. Alternatively, the movement of the mechanical shutter 52 could be automated by incorporating an electric motor 66 into the reality viewer 51.

As a further alternative, the mechanical shutter 52 could be replaced by a window located across the viewing aperture 11. The window may comprise a switchable glass made form electrochromic, micro-blind and or polymer dispersed liquid crystal materials. As a result, the window may be electrically switchable between a transparent and an opaque state to move the viewing aperture 11 between the required open and closed configuration.

In a yet further alternative embodiment, the window may be incorporated within the partially reflective surface 60.

In a first viewing mode, the reality viewer 51 is configured such that the viewing aperture 11 is closed. As a result, there is no view of the real world as the non-diverted optical path 63 is obstructed by the mechanical shutter 52. There is however a non-obstructed view of the electronic screen 4 via the diverted optical path 62. As a result, when in this configuration the reality viewer 51 is suitable for observing a virtual reality generated by the portable electronic device 9.

In a second viewing mode of reality viewer 51 the viewing aperture 11 is open. In this configuration, there is a direct view of the real world (as the non-diverted optical path 63 is not obstructed by the mechanical shutter 52) and a view of the electronic screen 4 via the diverted optical path 62. As a result, the view of the real world along optical path 63 is supplemented by the view of the electronic screen 4 along optical path 62. The two views are superimposed by means of the partially reflective surface 60. In other words, the two views are merged to form an augmented reality. When in this configuration, the reality viewer 51 is suitable for observing an augmented reality produced from images generated by the portable electronic device 9.

As well as an electronic screen 4, the portable electronic device 9, typically further comprises one or more cameras 8. Typically, the camera 8 is located on the opposing surface to the electronic screen 4. The camera 8 has a field of view in a direction substantially parallel to viewing axis 13 away from the main body 53. The camera may therefore provide a view of the real world, similar to the view through the viewing aperture 11 as provided by the non-diverted optical path 63 when not obstructed by mechanical shutter 52.

The frame 22 of reality viewer 51 may comprise a camera aperture 67 such that the field of view of camera 8 is not obstructed by the frame 22 The position of the camera aperture 67 upon the frame 22 may be varied between different frames 22 to accommodate the variation in camera 8 location on different types portable electronic devices 9.

In this mode of operation, the camera 8 can identify features in the real world and the portable electronic device 9 can thereafter adapt the image generated on the electronic screen 4. The portable electronic device 9 may require specialist software to process the images from camera 8 and adapt the image on the electronic screen 4 accordingly.

For example, in the second viewing mode of reality viewer 51, suitable for observing augmented reality, a user may see a stair case in the real world through the viewing aperture 11. The camera 8 may also view the stair case. The portable electronic device 9 can then be employed to amend the image on electronic screen 4 to reposition a character. When the two views are merged within the reality viewer 51 the character appears repositioned standing on the stair case.

The above described reality viewers 10, 51 offer a number of advantages over apparatus known in the art. A key advantage is the reality viewers 10, 51 can be employed to observe both a virtual reality or an augmented reality by interchanging between first and second viewing modes of operation. Furthermore, the reality viewers 10, 51 can provide both reality experiences with an immersive, maximised field of view.

Another key advantage of the reality viewers 10, 51 is that in the second viewing mode, suitable for augmented reality, there is a direct view of the real world. This direct view provides the user with, for example, depth perception.

In addition, the reality viewers 10, 51 is mobile, portable and universal. More specifically, it is compatible with numerous portable electronic devices 9 which a user may already own. The relatively expensive and more complex technology required to generate and evolve a virtual or augmented reality, such as interactive software and sensors, is typically contained within the portable electronic device 9. As a result, within the reality viewers 10, 51 itself there is a minimal amount of electronic and optical technology. This makes the reality viewers 10, 51 a low cost and a flexible platform to adapt and build upon.

A reality viewer is disclosed. The reality viewer comprises a frame suitable for holding a portable electronic device and a viewing aperture. The reality viewer can interchange between a first viewing mode wherein the viewing aperture is closed and a second viewing mode wherein the viewing aperture is open. The first viewing mode is configured for virtual reality operation as a user only observes the screen of the electronic portable device located within the frame. By contrast, in the second viewing mode is configured for augmented reality operation as a user observes the real world through the viewing aperture which is augmented by images generated by the electronic portable device located within the frame. The reality viewer also has the advantage of being mobile; low cost; employs simple technology; produces an immersive, maximised field of view; and provides a real-world view in augmented reality mode of operation.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A reality viewer comprising:
a main body having a viewing aperture;
a viewing axis perpendicular to the viewing aperture, the main body having a screen aperture parallel to and vertically offset from the viewing aperture; and
a frame attached to the main body that provides a means for locating a portable electronic device comprising an electronic screen with the screen aperture,
wherein the viewing aperture comprises a mechanical shutter that provides a means for opening and closing the viewing aperture, and
further wherein:
in a first mode of operation in which the viewing aperture is closed by the mechanical shutter, the electronic screen is visible along the viewing axis, and
in a second mode of operation in which the mechanical shutter is retracted in order to open the viewing aperture, images generated by the electronic screen augment a view along the viewing axis through the open viewing aperture.

2. A reality viewer as claimed in claim 1 wherein the reality viewer further comprises an optical system housed within the main body.

3. A reality viewer as claimed in claim 2 wherein when the reality viewer is in the first mode of operation the electronic screen is visible through the optical system.

4. A reality viewer as claimed in claim 2 wherein when the reality viewer is in the second mode of operation the optical system provides a means for the images generated by the electronic screen to be augment with the view through the open viewing aperture.

5. A reality viewer as claimed in claim 2 wherein the optical system comprises one or more lenses.

6. A reality viewer as claimed in claim 5 wherein the one or more lenses comprise a doublet lens.

7. A reality viewer as claimed in claim 5 wherein, the optical system further comprises a lens adjuster that provides a means for varying the focal distance of the one or more lenses.

8. A reality viewer as claimed in claim 2 wherein the optical system comprises a first and a second reflective surface wherein the reflectivity of the first reflective surface is greater than the reflectivity of the second reflective surface.

9. A reality viewer as claimed in claim 8 wherein the first and or second reflective surfaces comprise a mirror.

10. A reality viewer as claimed in claim 8 wherein the first and or second reflective surface comprises a prism.

11. A reality viewer as claimed in claim 8 wherein the first reflective surface is parallel to the second reflective surface.

12. A reality viewer as claimed in claim 11 wherein when the reality viewer is in the second mode of operation the first and second reflective surfaces bisect the viewing axis at 45 degrees.

13. A reality viewer as claimed in claim 12 wherein the one or more lenses lie in a plane parallel to the viewing axis.

14. A reality viewer as claimed in claim 1 wherein the main body further comprises one or more eyeholes.

15. A reality viewer as claimed in claim 1 wherein the main body further comprises a nose cavity.

16. A reality viewer as claimed in claim 1 wherein the main body further comprises one or more fixtures that provide a means for attaching the reality viewer to a head strap.

17. A reality viewer as claimed in claim 1 wherein the reality viewer comprises a universal controller that provides a means for remotely controlling a portable electronic device mounted in the screen locator.

18. A method of configuring a reality viewer having a main body having a viewing aperture, a viewing axis perpendicular to the viewing aperture, the main body having a screen aperture parallel to and vertically offset from the viewing aperture, and a frame attached to the main body that provides a means for locating a portable electronic device comprising an electronic screen with the screen aperture, the method comprising closing or opening the viewing aperture which comprises closing or opening a mechanical shutter, wherein:
when the viewing aperture is closed by the mechanical shutter, the electronic screen is visible along the viewing axis, and
when the mechanical shutter is retracted in order to open the viewing aperture images generated by the electronic screen augment a view along the viewing axis through the open viewing aperture.

19. A method of configuring a reality viewer as claimed in claim 18 wherein the method further comprises adjusting a focal length of one or more lenses.

20. A method of configuring a reality viewer as claimed in claim 18 wherein the method further comprises remotely controlling a portable electronic device located within the frame.

21. A reality viewer comprising:
a main body having a viewing aperture;
an optical system housed within the main body, wherein the optical system comprises a first and a second reflective surface wherein the reflectivity of the first reflective surface is greater than the reflectivity of the second reflective surface;
a viewing axis perpendicular to the viewing aperture, the main body having a screen aperture offset from the viewing axis and parallel to the viewing aperture; and
a frame attached to the main body that provides a means for locating a portable electronic device comprising an electronic screen with the screen aperture,
wherein the viewing aperture comprises a mechanical shutter that provides a means for opening and closing the viewing aperture, and
further wherein:
in a first mode of operation in which the viewing aperture is closed by the mechanical shutter, the electronic screen is visible along the viewing axis, and
in a second mode of operation in which the mechanical shutter is retracted in order to open the viewing aperture, images generated by the electronic screen augment a view along the viewing axis through the open viewing aperture.

* * * * *